(12) United States Patent
Johnson et al.

(10) Patent No.: US 12,549,502 B2
(45) Date of Patent: Feb. 10, 2026

(54) CONTEXT-AWARE ARTIFICIAL INTELLIGENCE AGENT FOR ENHANCED NETWORK-BASED TEXT MESSAGING

(71) Applicant: AT&T Intellectual Property I, L.P., Atlanta, GA (US)

(72) Inventors: Lars Johnson, Brooklyn, NY (US); Wei Wang, Montclair, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/665,519

(22) Filed: May 15, 2024

(65) Prior Publication Data
US 2025/0358251 A1 Nov. 20, 2025

(51) Int. Cl.
*H04L 51/063* (2022.01)
*H04L 51/02* (2022.01)

(52) U.S. Cl.
CPC ............ *H04L 51/063* (2013.01); *H04L 51/02* (2013.01)

(58) Field of Classification Search
CPC ... H04L 51/063; H04L 51/04; H04L 51/0646; H04L 67/306; H04L 51/02
See application file for complete search history.

(56) References Cited

U.S. PATENT DOCUMENTS

| | | | | |
|---|---|---|---|---|
| 2010/0223341 | A1* | 9/2010 | Manolescu | H04L 51/02 709/224 |
| 2016/0294745 | A1* | 10/2016 | Boothroyd | H04W 4/18 |
| 2018/0217968 | A1* | 8/2018 | Bastide | G06F 40/169 |
| 2018/0375803 | A1* | 12/2018 | Bastide | G06F 40/289 |
| 2021/0064692 | A1* | 3/2021 | Srinivasan | G06F 40/30 |
| 2022/0311727 | A1* | 9/2022 | Agarwal | H04L 51/046 |
| 2023/0325590 | A1* | 10/2023 | Shevchenko | G06F 40/186 715/200 |
| 2025/0113167 | A1* | 4/2025 | Kuoppamaki | H04W 4/14 |

OTHER PUBLICATIONS

Shawn Conahan, "RCS Live #2: Drive Revenue with Messaging Contextual Shortcuts (MCS)", President and Chief Revenue Officer, Wildfire Systems, Inc., Social Commerce Platform [PowerPoint Presentation], slides (33). https://www.gsma.com/futurenetworks/wp-content/uploads/2020/04/PDF-GSMA-Wildfire-Overview-April.pdf.

Doug Makishima, "It's All Connected: Rapid Chatbot Deployment & RBM Innovation", GSMA, Summit Tech-Confidential and Proprietary, IMS Services For LTE & 5G [PowerPoint Presentation], slides (42). https://www.gsma.com/futurenetworks/wp-content/uploads/2020/04/PDF-GSMA-RBM-Apr2020-Webinar-vFinal.pdf.

GSMA, "RCS Live #2: Drive Revenue with Messaging Contextual Shortcuts (MCS)—Catch Up", printed on May 16, 2024, pages (5). https://www.gsma.com/solutions-and-impact/technologies/networks/gsma_resources/rcs-live-wildfire-download/.

GSMA, "RCS Live #1: Rapid Chatbot Deployment & RBM Innovation—Catch Up", printed on May 16, 2024, pages (5). https://www.gsma.com/solutions-and-impact/technologies/networks/gsma_resources/rcs-live-summit-tech-download/.

* cited by examiner

*Primary Examiner* — Johnny B Aguiar

(57) ABSTRACT

A processing system including at least one processor may obtain a text message content from a sender to a recipient, identify additional contextual content based upon a context associated with at least one of: the sender and the recipient, generate a revised text message content based upon the text message content in accordance with the additional contextual content, and transmitting a message to the recipient comprising the revised text message content.

20 Claims, 5 Drawing Sheets

CONTEXT-AWARE ARTIFICIAL INTELLIGENCE AGENT FOR ENHANCED NETWORK-BASED TEXT MESSAGING

The present disclosure relates generally to machine learning, and relates more particularly to methods, non-transitory computer-readable media, and apparatuses for generating a revised text message content in accordance with additional contextual content identified from a context associated with a sender and a recipient.

BACKGROUND

Texting has gone from early fax machines, to pagers, to T9 inputs on your phone, to emojis and emoticons, and now to Multimedia Messaging Service (MMS) where short videos, audio, and pictures mix effortlessly with a thread of text between users. Today we text with other users, sometimes one to one, and sometimes in groups. We may search for gifs, or music to get our points across, or it might be a simple one-word response.

SUMMARY

The present disclosure broadly discloses methods, computer-readable media, and apparatuses for generating a revised text message content in accordance with additional contextual content identified from a context associated with a sender and a recipient. For instance, in one example, a processing system including at least one processor may obtain a text message content from a sender to a recipient, identify additional contextual content based upon a context associated with at least one of: the sender and the recipient, generate a revised text message content based upon the text message content in accordance with the additional contextual content, and transmitting a message to the recipient comprising the revised text message content.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
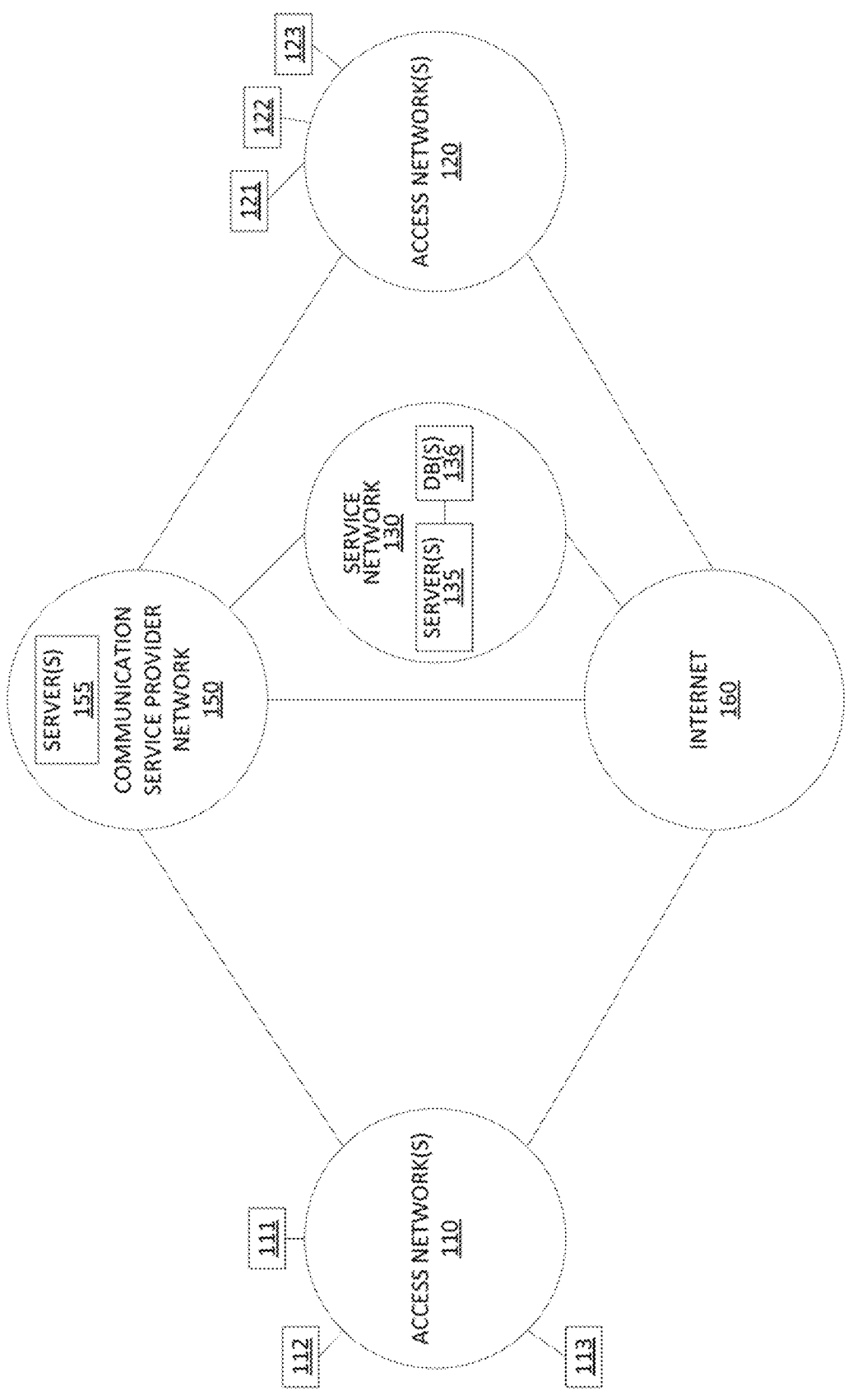
FIG. 1 illustrates an example system in which examples of the present disclosure for training a machine learning model on behalf of a first entity in accordance with at least one restricted data feature of at least a second entity that is inaccessible to the first entity to generate a trained machine learning model may operate.

The present disclosure broadly discloses methods, computer-readable media, and apparatuses for generating a revised text message content in accordance with additional contextual content identified from a context associated with a sender and a recipient. Notably, texting expects users to read messages and reply to each other, creating a thread where information and ideas pass back and forth. Some tools may scan incoming messages and/or outgoing messages being drafted to identify keywords/phrases, and to suggest shortcuts based on the content. For example, "meet me at 7:00" may provide a shortcut within a text message user interface to a calendar application. Alternatively, or in addition, a button may be presented via which a user may be offered the option for the device to create a calendar entry or reminder for 7:00. However, such tools do not learn anything about the user, or the user's relationships with other users. In contrast, examples of the present disclosure may account for a user's context and the nuances of the user's communications.

In particular, examples of the present disclosure include an artificial intelligence (AI) agent on the user's device or is network-based that may automatically edit a user's text messages based on additional contextual content associated with the user and the user's relationship with the other participant(s) in a text-based conversation. In one example, the AI agent may access user information on the user's endpoint device and/or from one or more network-based systems to derive the relevant additional contextual content. For instance, the AI agent may initially process messages from various text-based conversations of the user to group contacts into clusters/groups, where each group may be associated with a respective persona that the user may present when interacting with contacts within the respective groups. For example, the user's tone, diction, choice of words, attention to grammar and spelling, etc. may likely be different depending on whether the user is interactive with family, friends, professional contacts, teachers, contractors or other service providers, etc. Thus, in one example, each group may be created, where the AI agent may create, maintain, and utilize a different persona for each group, where each persona defines which user data items may generally be shared with members of a particular group and under what situations. For instance, a user may be willing to share location with an employer, but only during the work day. On the other hand, the user may prefer that a spouse or other family member(s) have access to the user's location information at all times. In one example, the AI agent may work with the user to define these groups and the rules that are associated with each. For instance, the AI agent may automatically cluster contacts into groups, but the user may reassign contacts to different groups. Alternatively, or in addition, a user may assign contacts to one or more groups, where the AI agent may further assign contacts to groups without overriding any specific user assignments. In one example, the AI agent may treat the user-specified assignment of contacts to groups as seeds for a semi-supervised clustering. In addition to defining which contacts are part of which group, the AI agent may also associate different rule sets to each group (e.g., for each persona associated with a respective group) for accessing and utilizing user data.

In one example, an AI agent of the present disclosure may include a local language model text editor/composer. For instance, the local language model may be derived from a generative AI-based large language model (LLM) that is further trained on a user's own messages to learn and adapt to the user's particular communication patterns, e.g., word selection, diction, grammar, etc. The AI agent may then provide context-based writing/drafting and/or editing of outgoing text message content. As such, examples of the present disclosure may provide the recipient with additional context to avoid misunderstandings. In one example, outgoing messages may be at least partially written by the AI agent, while replicating the user's persona (e.g., voice (text patterns), etc.). For instance, vague aspects of a text message content written by the user may be removed, modified, and/or replaced by discrete information to provide the reader/recipient with additional useful context. Examples of the present disclosure may therefore decrease miscommunication between users, saving time, money, resources (e.g., fuel, etc.), and so forth.

In one example, the AI agent may be granted permission by the user to access other applications on the same device as the text message application, e.g., to access user data, which may comprise additional contextual content that may be used for several purposes as described herein. In one example, the AI agent may be granted permission by the user to access user data from one or more network-based services (e.g., user data from a social media service provider, a calendar service provider, an over-the-top messaging service provider, etc.). Thus, the AI agent may use this user data/additional contextual content to understand what information the recipient should have, and hence what should be included in an outgoing text message. In one example, the user may create an initial text message content that includes what the user wants to say, but the AI agent may ensure that additional context that may be helpful to the recipient (or the recipient's endpoint device or AI agent) to better understand the situation (context) associated with the text message content and any prior context of the conversation.

To further illustrate, messages are often read without the context that the sender may expect. These messages may have unintended consequences that have a negative impact on the sender, the recipient, or both. As an example, a sender may text a recipient that the sender will "be there soon." However, if the recipient does not know where the sender is coming from, then the vagueness of the message may render the message effectively useless. To provide better utility to the recipient, a more informative message may provide context about where the sender is coming from, or currently at, the intended destination, and an estimate of how long it will take to get to the destination. For example, "there" may be a different location from a location of the recipient. In many cases, the context of a message may be more important than the content. Given the brevity of many message, the context of the message may be more equipped to communicate useful information than the user's selected words. For example, in response to a text message asking "where you are," a response of "on my way" is vague and provides little useful information. It is also time dependent-meaning that at the time the message was sent, the sender was in transit, but this does not guarantee that it is still true when the recipient device obtains and/or the recipient actually reads the message. Here additional context can provide more information, such as where the sender is, where the sender was when the message was sent (as opposed to when it was received), how the sender is moving from the prior location to a destination (e.g., car, walking, biking, etc.), and so forth.

Accordingly, the AI agent may take a user-generated short form text message content and create an improved message content therefrom. In one example, the AI agent may look at the recipient(s) of the message, and may select a persona (e.g., a local language model) as described above to use in generating a revised text message content. Using this persona, the AI agent may then edit the message (which can also be considered as composing a new text message) based on: (1) the user-generated text message content and (2) additional contextual content to generate a modified text message content that may be more fully understood by the recipient. In one example, the AI agent and/or a persona thereof may comprise a generative artificial intelligence/machine learning (AI/ML)-based model that may be tuned based on various factors, such as the user tone, language, the style, etc. that may be used for interactions with contacts of a particular group. In addition, the generative AI/ML-based model may be provided with additional contextual content, such as the particular relationship between users, their conversation history, the mood of one or both participants, etc., to generate personalized writing. For instance, a prompt to a generative AI/ML-based model may include the user's text message content and the additional contextual content, where the generative AI/ML-based model may be tasked with crafting a new text message content in accordance with the user's persona, and based upon the original text message content and the additional contextual content.

In one example, the present disclosure may also enable the exchange of additional contextual content between endpoint devices, e.g., AI agents thereof, on behalf of respective text conversation participants. In some cases, if these messages back and forth are overlaid with the actual text messages/text message content, a recipient may be further burdened with sorting through all of the extra messages to find the important piece(s). Accordingly, in one example, the present disclosure may provide for separate AI agent-to-AI agent communications that are not presented to the respective participants. In one example, AI agent-to-AI agent communication may be provided via a Rich Communication Services (RCS) protocol, or suite. In particular, RCS enables the communication of text, video, voice, etc. in addition to the actual text message content being sent. This could be applied to signatures or public keys, such as decentralized identifier communications (DIDComm). Notably, RCS was designed so that suggestion answers to text messages could be sent along with the message. This make it easy for a recipient to unlock a message, and then respond with a single tap. These pre-built responses are based solely on the content of the message. A message asking a yes or no question may provide the possible answers "yes," "no," and "maybe." These suggested responses are all based on the content of a text itself, and ignore the context entirely. However, in accordance with the present disclosure, RCS may be used for devices and AI agents to share additional contextual content. In this way, a message that is received can be read in the same frame of reference as it was sent. In one example, the additional contextual content may be used by a receiving AI agent to further influence how the receiving AI agent may modify/generate a text message content in the other direction. In other words, the AI agent of a message sender may provide additional context as a sublayer to the message (e.g., in addition to the original or edited/modified text message content). Likewise, the recipient device/AI agent may request specific contextual items, or may include such a request in a response when the user generates a text message content for reply.

Alternatively, or in addition, in one example, the present disclosure may add an Internet Protocol (IP) address into a text message header (e.g., a Short Message Service (SMS) and/or Multimedia Message Service (MMS) header). Using these IP addresses, AI agents may establish and/or maintain sessions for exchange of additional contextual content. In addition, such exchange of additional contextual content may continue online, even when respective endpoint devices are not connected to a mobility network. In particular, a mobile smart phone is typically assigned an IP address (e.g., at least one IP address) for its data streams. Appending such an IP address into the header of a text message may enable the recipient's endpoint device to then send data directly to the sender's endpoint device over any network connection. Alternatively, or in addition, an IP address included in a text message header may be used to route device-to-device specific messages to IP-interfaced servers where additional contextual content may be obtained. The users' text messages may still be processed via SMS/MMS infrastructure in existing network architectures. In one example, an additional header field may be used to alert the network and receiving device to the fact that a message is requesting and/or conveying additional contextual content.

It should be further noted that in many cases, context will likely differ for the sender and the receiver, meaning that there could be confusion with respect to vague messages. In one example, an AI agent may also include a reader module that scans incoming messages, and tries to make sense of the incoming message, e.g., to derive an intent. If the sender's intent is not clear (e.g., a confidence for a particular intent does not exceed a threshold, or the like), the recipient's AI agent may ask for help from the sender's AI agent. In one example, users may consent or opt-in to the information retrieval process performed by the AI agent(s), e.g., in the same or similar manner as permissions are granted or revoked for other applications that may be in operation on an endpoint device. An example where context may differ is where there is a language/dialect difference between sender and recipient, such as generational language. For example, a grandchild may write a text message to a grandparent using various acronyms or shorthand, whereas the grandparent may prefer to see words written out.

In another example, contexts may be different where users have different time sensitivities. For instance, one person might have a time constraint for finishing a meeting which is different from the other person. Similarly, users may have different location or event sensitivities. For example, one person might be in a theater or driving and may only want to be notified of emergencies. In this case, enhancement of text message content with voluminous additional contextual content may be unnecessary because the recipient is not going to look at the message(s) anyway, or at least will not see the messages until some time has passed and much of the additional contextual content may be stale or no longer relevant. However, if the message is of high importance (e.g., to either the sender or the recipient) a notification may be generated at the endpoint device to alert the recipient that the message should be read sooner.

Other contexts may be clear, or may be clarified and identified via exchange of additional contextual information. For example, places/locations, such as "the store," "my friend's house," or "10 minutes away" may be completely vague if the recipient has no idea of which store, which friend, or 10 minutes away from where. An AI agent of the sender and/or the recipient may identify this gap in context and may fill in the gap by sharing additional contextual content, or may request additional contextual content from the AI agent of the other participant in a text-based conversation, e.g., in a background process. On the other hand, if the conversation history indicates that the context is clear, then additional contextual content may be omitted. For example, if one spouse asked another spouse to pick up groceries as a particular supermarket. The answer of "at the store" in response to the question "where are you?" may be perfectly understandable to the spouse receiving the answer to the question. In this regard, it should again be noted that an AI agent may have permission and be granted access to a user's conversation history so that the AI agent can determine when additional contextual content is warranted and when it is unnecessary or redundant.

Examples of the present disclosure therefore learn from conversations spanning multiple text messages, enabling generative AI/ML to learn how a user converses with different contacts and/or groups of contacts, what information the user considers useful, when context (e.g., additional user data or derived from user data) should be offered and to whom, how a user interacts in different settings even with the same contacts, and so forth. To further illustrate, additional contextual content/data may include schedules, traveling habits, current location, activities, conversation histories, relationships between users, and so forth. An AI agent may therefore know a user's likely status, even if the user is not presently on the endpoint device.

Thus, examples of the present disclosure take what a user has to say, and reframes the intent as a message of what the user actually means and/or what should be understood by the intended recipient. A generative AI/ML-based writer may process a user's text message content as input, gather additional contextual content, and revise the text message content into an improved outgoing message. Advantageously, examples of the present disclosure may result in fewer follow up messages in conversations, with more useful and relevant information being passed in the first message or earlier in the conversation. Likewise, a generative AI/ML-based reader may scan incoming messages and fill in missing pieces to allow a user to make sense of what the sender was trying to say. To enable the generative AI/ML-based reader to provide optimal results, in one example, it may be granted network access to communicate with the sender's endpoint device and/or another AI agent thereof. The sender's device/AI agent may send separate messages to the recipient's endpoint device that includes extra information that is not for direct consumption by the recipient. Rather, additional contextual content may be used by the AI agent/reader to determine the context. If there is a determination that more information (e.g., additional contextual content) is desirable, then the receiver's AI agent/endpoint device may transmit a message back to the sender's endpoint AI agent/endpoint device requesting additional contextual content pertaining to the topics for which clarification is requested. Accordingly, AI agents may be integrated with local (on device) and/or cloud-based text message applications (e.g., a device-native SMS/MMS application), email applications, calendar applications, contacts lists, messaging applications (e.g., over-the-top (OTT) messaging applications), and so forth, each with limits and privacy controls, which the user may define, control, and adjust over time. These and other aspects of the present disclosure are discussed in greater detail below in connection with the examples of FIGS. 1-5.

To aid in understanding the present disclosure, FIG. 1 illustrates an example system 100 comprising a plurality of different networks in which examples of the present disclosure may operate. Communication service provider network 150 may comprise a core network with components for telephone services, Internet services, and/or video services (e.g., triple-play services, etc.) that are provided to customers (broadly "subscribers"), and to peer networks. In one example, communication service provider network 150 may combine core network components of a cellular network with components of a triple-play service network. For example, communication service provider network 150 may functionally comprise a fixed-mobile convergence (FMC) network, e.g., an IP Multimedia Subsystem (IMS) network. In addition, communication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Communication service provider network 150 may also further comprise a video broadcast network, e.g., a television broadcast network, such as a cable provider network or an Internet Protocol Television (IPTV) network, as well as an Internet Service Provider (ISP) network. With respect to video service provider functions, communication service provider network 150 may include one or more video servers for the delivery of video content, e.g., a broadcast server, a cable head-end, a video-on-demand (VOD) server, and so forth. For example, communication service provider network 150 may comprise a video super hub office, a video hub office and/or a service office/central office.

In one example, communication service provider network 150 may also include one or more servers 155. In one example, the servers 155 may each comprise a computing system, such as computing system 500 depicted in FIG. 5, and may be configured to host one or more network-based systems/components in accordance with the present disclosure. For example, a first system component may comprise a database of assigned telephone numbers, a second centralized system component may comprise a database of basic customer account information for all or a portion of the customers/subscribers of the communication service provider network 150, a third centralized system component may comprise a cellular network service home location register (HLR), e.g., with current serving base station information of various subscribers, and so forth. Other system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other system components may include, for example, a layer 3 router, an SMS server and/or an MMS server, a voicemail server, a video-on-demand server, a server for network traffic analysis, and so forth. It should be noted that in one example, a system component may be hosted on a single server, while in another example, a system component may be hosted on multiple servers, e.g., in a distributed manner. For ease of illustration, various components of communication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between communication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the communication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user devices and/or one or more servers of one or more service providers, such as a social media service provider, an over-the-top (OTT) messaging application service provider, a navigation service provider, an online calendar/scheduling service provider, and so on.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the communication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where communication service provider network 150 may provide service network 130 functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like. In one example, endpoint devices 111-113 and 121-123 may each comprise all or a portion of a computing device or system, such as computing system 500, and/or processing system 502 as described in connection with FIG. 5 below, specifically configured to perform various steps, functions, and/or operations for generating a revised text message content in accordance with additional contextual content identified from a context associated with a sender and a recipient, as described herein. For example, any one or more of endpoint devices 111-113 and 121-123 may perform operations in connection with the example method 400, or as otherwise described herein. For instance, any one or more of endpoint devices 111-113 and 121-123 may comprise an AI agent as described herein that may obtain a text message content from a sender to a recipient, identify additional contextual content based upon a context associated with the sender and the recipient, generate a revised text message content based upon the text message content in accordance with the additional contextual content, and transmitting a message to the recipient comprising the revised text message content, and so forth.

Figure 5:
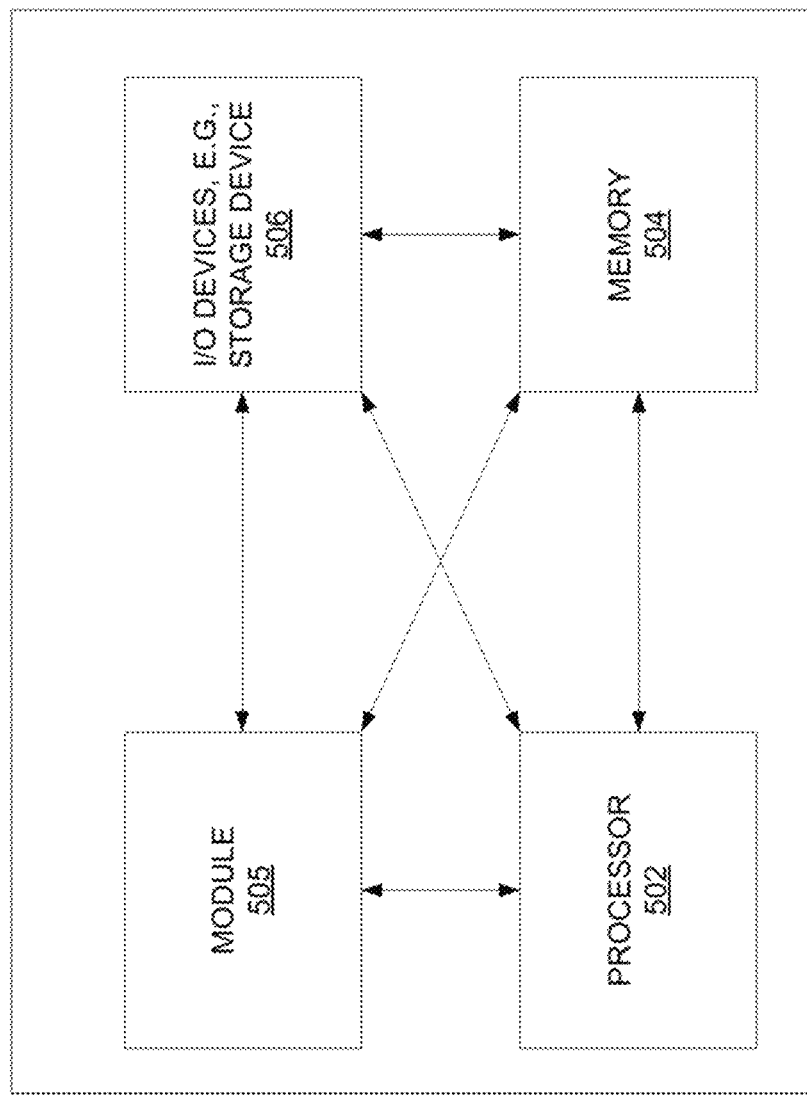
FIG. 5 illustrates an example of a computing device, or computing system, specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the communication service provider network 150. For example, the service network 130 may comprise one or more devices for providing services to subscribers, customers, and/or users. For example, communication service provider network 150 may provide a cloud storage service, web server hosting, and other services. As such, service network 130 may represent aspects of communication service provider network 150 where infrastructure for supporting such services may be deployed. In another example, service network 130 may represent a third-party network, e.g., a network of an entity that provides for AI agent hosting and/or machine learning model platform as a service to various other entities.

In the example of FIG. 1, service network 130 may include one or more servers 135 which may each comprise all or a portion of a computing device or system, such as computing system 500, and/or processing system 502 as described in connection with FIG. 5 below, specifically configured to perform various steps, functions, and/or operations for generating a revised text message content in accordance with additional contextual content identified from a context associated with a sender and a recipient, as described herein. For example, one of the server(s) 135, or a plurality of servers 135 collectively, may perform operations in connection with the example method 400, or as otherwise described herein. In one example, the one or more of the servers 135 may comprise a data feature store and/or machine learning model development and hosting platform (e.g., a network-based and/or cloud-based service hosted on the hardware of servers 135).

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of systems for generating a revised text message content in accordance with additional contextual content identified from a context associated with a sender and/or a recipient, as described herein. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like.

In one example, DB(s) 136 may be configured to receive and store user data associated with various network-based services, such as text messaging applications (e.g., native SMS/MMS and/or OTT applications), social media applications, calendar applications, map/navigation applications, and so forth. In one example, DB(s) 136 may be configured to receive and store network operational data collected from the communication service provider network 150, such as call logs, mobile device location data, and other information and statistics. Any or all of such data may be compiled and processed, e.g., normalized, transformed, tagged, etc., and forwarded to DB(s) 136 directly or via one or more of the servers 135. For instance, users may have different contact lists from various applications, which may have different formats for each contact record, and which may be normalized to a singular format for storage in DB(s) 136.

Figure 2:
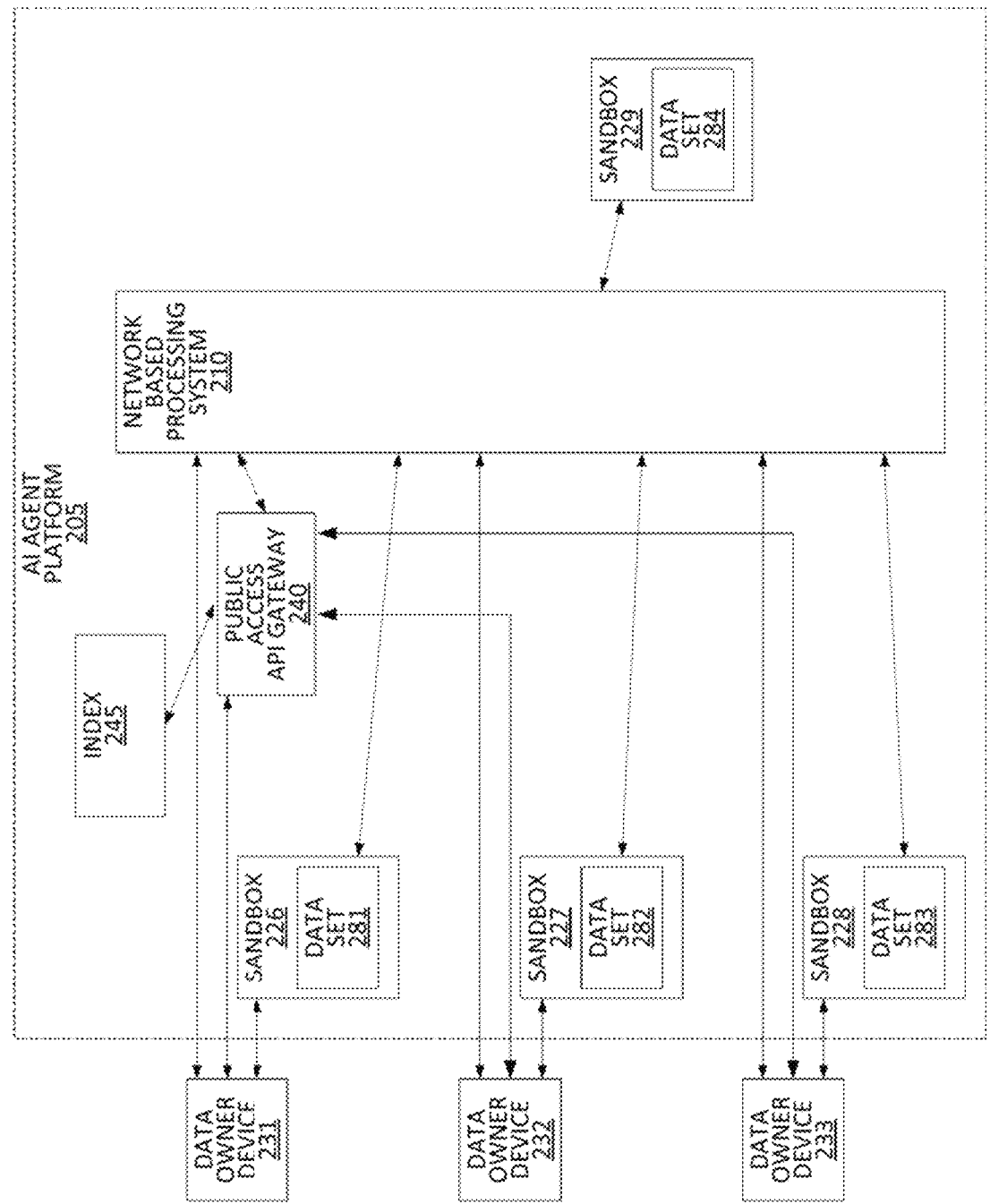
FIG. 2 illustrates an example system including an artificial intelligence agent platform, according to the present disclosure.

In one example, the user data may include transcripts of various text conversations via SMS/MMS and/or one or more OTT messaging applications, user location data, contact list and contact information, including names, relationship types (e.g., friend, family, colleague, service provider, etc.), and so forth. User data may also include user calendar information (e.g., scheduled calls, meetings, sports, social, and other events, or the like), user status information (e.g., busy/do not disturb, at work, in transit, etc.), user mood information, user biometric information, such as from a smartwatch or other network-connected biometric devices, and so forth. It should be noted that in each case, the data stored by DB(s) 136 may be associated with respective users and may comprise additional contextual content and/or may be used to derive or generate additional contextual content that may be used for various purposes in accordance with the present disclosure, including contact grouping/clustering, training machine learning models, for applying as inputs to machine learning models, e.g., providing additional contextual content to AI/ML-based agents that are deployed and in operation for generating predictions, inferences, or the like. It should be noted that the user data may be segregated and subject to data privacy and security measures such that user data is only utilized in accordance with granted user permissions and only on an as-needed basis to fulfill an authorized task on behalf of the respective user. For instance, server(s) 135 or server(s) 135 in conjunction with DB(s) 136 may comprise an AI agent platform 205 (e.g., a network-based data sharing platform) such as illustrated in FIG. 2 and described in greater detail below.

As noted above, server(s) 135 may be configured to perform various steps, functions, and/or operations for generating a revised text message content in accordance with additional contextual content identified from a context associated with a sender and/or a recipient, as described herein.

Figure 4:
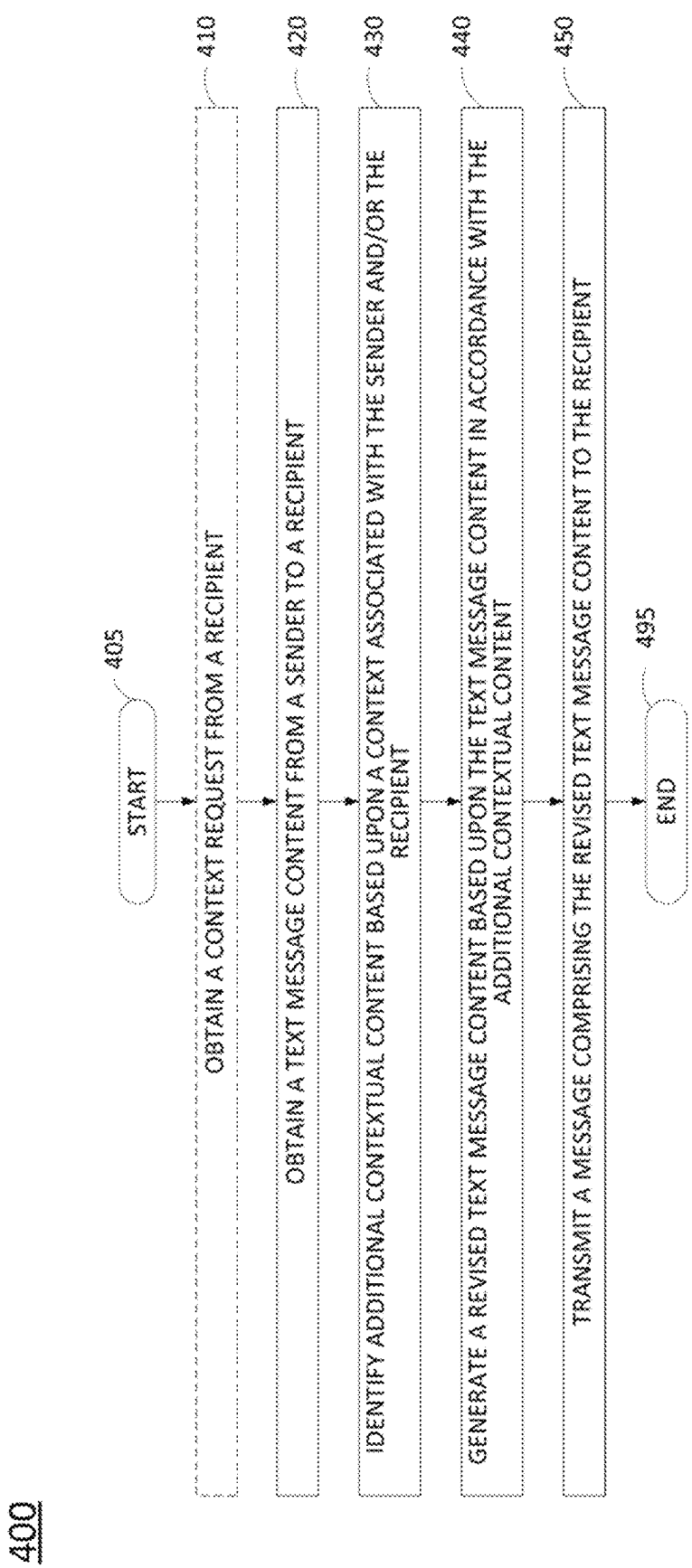
FIG. 4 illustrates a flowchart of an example method for generating a revised text message content in accordance with additional contextual content identified from a context associated with a sender and a recipient.

For instance, an example method for generating a revised text message content in accordance with additional contextual content identified from a context associated with a sender and/or a recipient is illustrated in FIG. 4 and described in greater detail below. In addition, server(s) 135 may perform various additional operations as described in connection with FIG. 2, or elsewhere herein. It should also be noted that in one example, an AI agent developed via server(s) 135 may be deployed to one of the endpoint devices 111-113 or 121-123 for use by a respective user.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in communication service provider network 150, and so forth. Thus, these and other modifications are all contemplated within the scope of the present disclosure.

FIG. 2 illustrates an example system 200 including an AI agent platform 205 (e.g., a network-based AI-agent development platform). In one example, the AI agent platform 205 may comprise a processing system, e.g., a server or multiple servers collectively configured to perform various steps, functions, and/or operations in accordance with the present disclosure. In one example, the AI agent platform 205 includes a network-based processing system 210, e.g., a server or multiple servers collectively configured to perform various steps, functions, and/or operations in accordance with the present disclosure. In one example, AI agent platform 205 may be represented by server(s) 135 and/or DB(s) 136 in FIG. 1, or vice versa. In one example, the network-based processing system may comprise all or a portion of a computing device or system, such as computing system 500, and/or processing system 502 as described in connection with FIG. 5 below, specifically configured to perform various steps, functions, and/or operations in accordance with the present disclosure. It should also be noted that the components of network-based processing system 210 and the AI agent platform 205 may comprise various combinations of computing resources (e.g., processor(s), memory unit(s), and/or storage unit(s)) on the same or different host devices, at the same or different locations (e.g., in the same or different data centers). For example, processors assigned to execute instruction sets for different components may be separate from the associated memory resources, which may be separate from associated storage resources where data sets or other data are stored, and so on.

As further illustrated in FIG. 2, the AI agent platform 205 includes a plurality of sandboxes 226-229 (e.g., "private sandboxes") and a public access application programming interface (API) gateway 240. In various examples, sandboxes 226-229, the data sets 281-284 stored in the different sandboxes 226-229, and/or the public access API gateway 240 may comprise virtual machines, application containers, or the like operating on one or more host devices. In addition, each of sandboxes 226-229, the data sets 281-284 stored in the different sandboxes 226-229, and/or the public access API gateway 240 may comprise various combinations of computing resources, e.g., processor(s), memory unit(s), and/or storage unit(s) on one or more shared host devices and/or on separate host devices. Each of the data sets 281-284 may take a variety of different forms. However, for illustrative purposes, data sets 281-284 may be considered to each include respective user data such as described above, e.g., text message conversations/transcripts, calendar information, user status information, user mood information, user biometric information, and so forth. In addition, at least some of the user data may comprise restricted data features, e.g., available for limited use by other entities via the AI agent platform 205, as described herein. In addition, for illustrative purposes, the AI agent platform 205 may comprise a relational database system (RDBS). However, in other, further, and different examples, AI agent platform 205 may comprise a different type of database system, such as a hierarchical database system, a graph-based database system, etc.

In one example, any one or more of the sandboxes 226-228 may be hosted on shared infrastructure within the network-based processing system 210 (e.g., where a trusted entity controls and operates the data sharing platform, but where the data owners (e.g., respective users) have independent control and access of the respective sandboxes 226-228 and the data sets 281-283 stored therein). For instance, a provider of an AI/ML-based agent development service via the AI agent platform 205 may also securely and separately store data sets 281-283 in sandboxes 226-228 on behalf of the respective users. Thus, AI agent platform 205 may provide services to a number of different users, and may interact with a number of user devices, such as data owner devices 231-233. Each of the user devices may comprise a desktop computer, a cellular smart phone, a laptop, a tablet computer, a cloud based processing system providing a user environment, and so forth. In particular, AI agent platform 205 may be operated by a trusted party to store data sets on behalf of data owners in a secure and restricted manner, to provide for the use of restricted data features, e.g., for training of AI/ML-based agent via the AI agent platform 205 and for providing additional contextual data to AI/ML-based agents in operation in accordance with authorizations from users, and so on.

To illustrate, sandbox 226 may store data set 281 for a first data owner/user, which may comprise network operational data collected from a communication service provider network, such as call logs, mobile device location data, call detail records (CDRs), text message transcripts, etc., calendar information, biometric information, social media information, contact list(s), and other information and statistics. The data set 281 may include raw data and/or may include data that have been normalized, transformed, tagged, etc. before uploading to the AI agent platform 205. In one example, the data in data set 281 may be uploaded via data owner device 231 and stored in sandbox 226. Alternatively, or in addition, the AI agent platform 205 may be configured to obtain and/or receive the data comprising data set 281 directly from a communication network infrastructure (not shown). The sandbox 226 may represent a secure data storage and data processing environment that is only accessible to the first user (or another person or entity authorized on behalf of the first user) and to the network-based processing system 210. Similarly, sandbox 227 may store data set 282 for a second data owner/user, which may comprise the same or similar types of user data as described above, and likewise for sandboxes 228 and 229 storing data sets 283 and 284, respectively.

Alternatively, or in addition, a sandbox may be associated with a network-based service provider, such as a social media service provider, an OTT messaging application service provider, a calendar application service provider, etc. In such, case user data of a single user may be spread over multiple sandboxes of respective network-based service providers of which a user may obtain services. For instance, in another example, data set 283 in sandbox 228 may comprise user data associated with a social media service, such as user contact data, transcripts/records of text-based communications via the social media service, etc. As in the preceding example(s), the data set 282 may include raw data and/or may include data that have been normalized, transformed, tagged, and/or anonymized, etc. before uploading to the AI agent platform 205. In addition, it should be further noted that the sandbox 228 may represent a secure data storage and data processing environment that is only accessible to the second data owner (or another person or entity authorized on behalf of the second data owner) and to the network-based processing system 210. In another example, AI agent platform 205 may comprise a feature store in which network-based service providers may contribute respective data sets that are securely stored in a segregated manner, e.g., in separate sandboxes 226-228 with different encryption keys, different access codes/password protection, etc., and where user data of a particular user may be requested from the respective sandboxes 226-228 for limited use in connection with AI agent training and/or operations as described herein. For instance, sandbox 229 may be instantiated and assigned to a user and may be populated with various user data, e.g., from one or more sandboxes 226-228 that may be associated with different service providers (e.g., a social media service provider, an OTT messaging application service provider, etc.). After a defined period of time, such as 2 hours, 24 hours, or the like, or when the user data is no longer considered relevant to a current context of the user and/or a conversation of the user, the user data from other sandboxes may be delated from sandbox 229.

In one example, the AI agent platform 205 may provide access to an index 245, e.g., via public access API gateway 240. The index 245 may include information about which data sets 281-283 and/or sandboxes 226-228 are associated with respective users or other data owners. In an example in which AI agent platform 205 supports restricted and non-restricted data features, the index 245 may also identify for each data set and for each data feature whether the data feature is restricted or not. For instance, a data feature may be provided with different access/permission levels. For example, a user may designate one or more contact groups (e.g., family and/or friends) for having unrestricted access to a data feature, while the data feature may remain "restricted" for any other contact groups (e.g., work contacts, service providers, etc.). Alternatively, or in addition, data features may have different restrictions or permission levels for use in AI agent training.

In one example, sandboxes 226-229 may also store AI agents and/or one or more personas, e.g., local language models that may be used by an AI agent as described herein. For instance, a sandbox 229 may be instantiated for a user and may be populated with various user data. In addition, an AI agent may be created from a template (e.g., a machine learning algorithm with various pre-set or user-selected hyperparameters) that is available via a machine learning model MLM) catalog/repository of the AI agent platform 205. In one example, development of the AI agent may be provided via sandbox 229, such as hyperparameter selection, training of the AI agent via the data owner's own data features, etc.

It should be noted that as referred to herein, a machine learning model (MLM) (or machine learning-based model), may broadly include models for prediction, classification, forecasting, and/or detection, and may comprise a machine learning algorithm (MLA) that has been "trained" or configured in accordance with input data (e.g., training data) to perform a particular service, e.g., to respond to prompts/queries and/or to otherwise generate text outputs in response to prompts, to forecast weather, to classify images, to predict user arrival times, and so forth. Examples of the present disclosure may incorporate various types of MLAs/models that utilize training data, such as support vector machines (SVMs), e.g., linear or non-linear binary classifiers, multi-class classifiers, deep learning algorithms/models, such as deep learning neural networks or deep neural networks (DNNs), generative adversarial networks (GANs), decision tree algorithms/models, k-nearest neighbor (KNN) clustering algorithms/models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. In one example, MLAs/MLMs of the present disclosure may be in accordance with an open source library, such as OpenCV, which may be further enhanced with domain specific training data.

In one example, an AI agent (also referred to herein as an AI/ML agent or ML-based agent) may comprise an ML-based generative model, such as a language model, e.g., a "large language model" (LLM). For instance, the ML-based generative model may comprise a generative adversarial network (GAN), a bidirectional encoder representations from transformers (BERT) model (e.g., BERT-Base, BERT-Large, etc.), a generative pre-training (GPT) model (e.g. GPT, GPT-2, GPT-3, or the like), or other generative natural language processing (NLP) models. In one example, a generative model of the present disclosure may be used in conjunction with engineered prompts, e.g., in which a user-drafted text message content is embedded within the prompt, provided along with the prompt, and/or retrieved based upon the content of the prompt. Similarly, in one example, additional contextual content may be embedded within the prompt, provided along with the prompt, and/or retrieved based upon the content of the prompt. Alternatively, or in addition, examples of the present disclosure may supplement the prompts and capabilities of the generative model using retrieval augmented generation (RAG). For instance, user data (e.g., additional contextual content) may be ingested, vectorized, and added to data set(s) 281-284, where such information may be retrieved in connection with an ML-based agent processing a particular prompt/query. However, in one example, more recent additional contextual content (such as recent text message contents in a conversation chain) may be added to a prompt.

To further illustrate, user data, such as text message conversation transcripts, contact lists, schedules, biometric data, etc., may be ingested by network-based processing system 210 and chunked/segmented, from which vectors/vector embeddings may be generated, such as using word2vec and/or doc2vec, and so forth. These vectors may then be stored in the associated data sets 281-284. In one example, additional contextual content/user data (or vectors associated with additional contextual content) may be retrieved in accordance with a prompt. For instance, network-based processing system 210 (and/or an AI agent of one of sandboxes 226-229 that may be in operation on the network-based processing system 210) may receive a prompt, and may perform a search over the vectors in a respective data set based upon the prompt, e.g., a semantic search. For instance, the prompt may be similarly vectorized and the vectors/vector embeddings of the prompt may be compared to vectors in a respective one of the data sets 281-284 to find the closest matching vectors, e.g., via a distance measure in a hyper-dimensional feature space. It should again be noted that the prompt may include a user-prepared text along with conversation history (e.g., recent additional contextual content). In accordance with the present disclosure a prompt may have a structured format such that the ML-based generative model may generate an updated/revised text message content in the text of the user based upon the additional contextual content. For instance, the prompt may have a well-defined format, e.g., a template, such as: "Generate a response to the other party. The response should be in the text of the user and include information the other party may find useful in the context. The response should also convey the following intent: (insert user-drafted text message content). The recent conversation history is: (insert recent conversation history)." In one example, the recent conversation history may be over a defined period of time, e.g., the last 2 hours, the last 24 hours, etc. Alternatively, or in addition, the recent conversation history may include messages that may be grouped based on time (e.g., messages close in time to a likely related or a same topic, whereas longer gaps may indicate a new topic of conversation), or may be grouped based on time and subject matter (e.g., messages close in time and with semantically related content may be grouped together), etc.

In any case, the prompt may be vectorized and a respective one of data sets 281-284 may be scanned to find the closest matching vectors. In one example, the identified vectors may be further joined with the prompt to create an enhanced prompt comprising an input, or input data set for an ML-based generative model. In other words, the additional contextual content may be added to the prompt. The enhanced prompt may then comprise an input to the ML-based generative model (e.g., an LLM), which may then generate an output comprising a revised/update text message based on the user-drafted text message content, and including additional information based upon the additional contextual content that is used to supplement the prompt.

Alternatively, or in addition, an AI agent of the present disclosure may include a different configuration or architecture. For example, an AI agent of the present disclosure may include an intent-determining component to learn intents, and an action-selection component to select actions (e.g., to generate a response/output). In one example, the intent-determining component may comprise a natural language understanding (NLU) module, which may be a trained MLM comprising a support vector machine (SVM), a deep neural network (DNN), such as a recurrent neural network (RNN), a long short-term memory (LSTM) model, etc., and so forth. In accordance with the present disclosure, the intent may be determined from among a defined set of intents, and can be based on the text message content (e.g., a user-drafted text message content), message history context and/or other context, e.g., in view of past actions of the user or other similar users with the same or other conversation partner(s), and so forth. For example, the intent of a given user can be based on the user's own chosen words, but may be further informed by one or more messages from another party, as well as additional context that may be provided by the other participant(s) AI agent(s). For instance, the other participant's AI agents may request additional context, which may also be used as additional context by the receiving AI agent (e.g., the fact that the other AI agent is asking for a certain type of additional context can also reveal the intent of the other participant and/or his or her AI agent).

In one example, the action-selection component may be rule-based. For instance, the intent may indicate one or more types of additional contextual content to retrieve based upon one or more rules that map intents to additional contextual content types. In one example, the modification of the user-drafted text message content may be template based, e.g., presenting the user-generated text message content followed by "here is some additional information you may find useful: (insert retrieved additional contextual content)." In another example, the additional contextual content may be retrieved using sematic search based on the intent. Alternatively, or in addition, the text message content may be modified using an additional trained MLM component based upon addition contextual content that is retrieved. For instance, a generative component/module may comprise a trained GAN, an RNN, etc. It should be noted that still other architectures and configurations may be used in accordance with the present disclosure. In addition, an AI agent of the present disclosure may include other, further, and different components, such as a translation module (e.g., to translate between different languages that may be used by respective users/participants in a text-based conversation), a speech-to-text and/or text-to-speech component, e.g., for dictation and/or hands-free message retrieval, a feedback and/or reinforcement learning RL) component (e.g., to learn from user feedback regarding whether generative text content is acceptable to the user or not), and so forth.

In one example, an AI agent of the present disclosure may be personalized to a user. For instance, an LLM may be trained on a corpus of training data that includes a substantial component of user-specific content (e.g., in addition to general-knowledge content), including outgoing and incoming text messages of the user, transcribed audio of the user, other writings of the user, such as articles, blogs, social media posts, etc. In one example, an AI agent of the present disclosure may include multiple sub-models that may be further trained specific to one or more user personas. For instance, a user may use a different "voice," including tone, choice of words, diction, attention to grammar and spelling, dialect, etc. with respect to different contacts or groups of contacts. Thus, in one example, training data that is specific to each "persona" and/or type of contact may be used to train one or more ML-based models comprising an AI agent of the user. In another example, an AI agent of the present disclosure may implement a language model that is trained on a general knowledge base (e.g., GPT-4, BERT-large, etc.) and that is supplemented with user-specific knowledge/context and/or persona-specific knowledge context. For instance, in addition to RAG for providing more immediate context (e.g., where is the user, what is the user's estimated time of arrival (ETA), etc.), the present disclosure may supplement a prompt with an information set comprising prior communications of a user (and/or vectors generated therefrom as described above). For instance, to bias the AI agent to generate a revised text message content in a particular persona of the user for a category of "close friends," the input/prompt may be supplemented by past user correspondence with close friends such that when the prompt directs to "respond in the voice of the user," the ML-based model may utilize the data contained in the user's interactions with close friends to extract the "style" utilized with close friends.

It should also be noted that in one example, an AI agent of the present disclosure may be network-based/network-deployed. For instance, the AI agent platform 205 may be included in a communication path for text message exchange between users'/participants' devices, and may process user-drafted text message content via respective AI agent that may be instantiated by the AI agent platform 205. In one example, the AI agents may run in respective sandboxes 226-229, or the like and may ingest user-drafted text message content and may output revised text message content for onward transmission to a recipient's device and/or a network-based AI agent thereof (which may also be in operation on the AI agent platform 205). Thus, these and other modification are all contemplated within the scope of the present disclosure.

Figure 3:
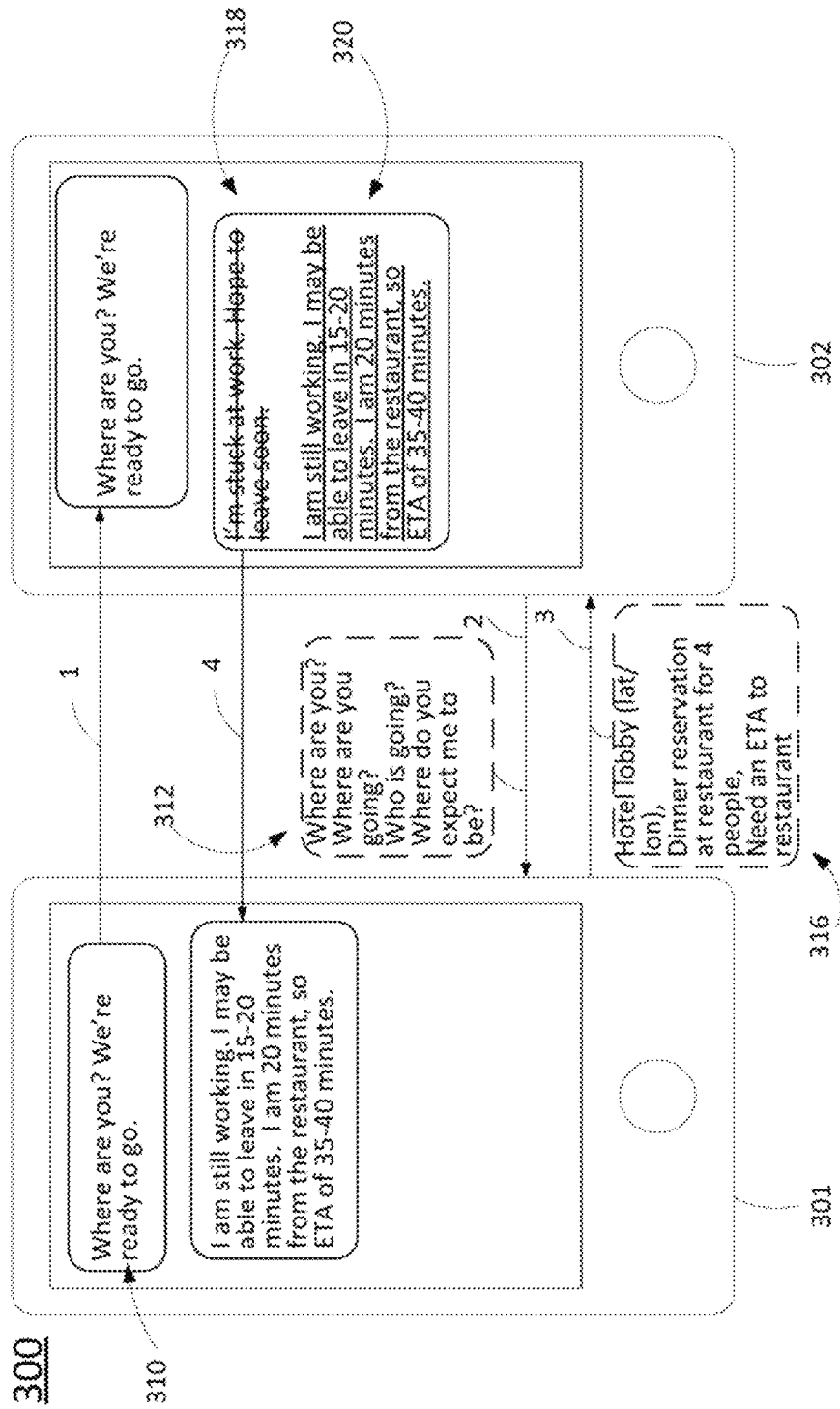
FIG. 3 illustrates an example message exchange including artificial intelligence agents for two participants in a text-based conversation, in accordance with the present disclosure.

FIG. 3 illustrates an example message exchange 300, including AI agents for two participants in a text-based conversation in accordance with the present disclosure. For instance, a first user/participant with device 301 may engage in a text-based conversation with a second user/participant with device 302. At stage 1, the first participant may send a first text message 310 with the text message content "Where are you? We're ready to go." In the absence of the present disclosure, the second user may send a text message with user-generated text message content 318 "I'm stuck at work. Hope to leave soon." However, in accordance with the present disclosure, an AI agent of the second user on device 302 (e.g., a "second AI agent") may receive and process the incoming text message 310. The second AI agent may attempt to update/edit the user-drafted text message content 318 to be more informative and avoid numerous back and forth messages attempting to clarify the context. For instance, at stage 2 the second AI agent may send a context request 312. The context request may seek additional contextual content that may be relevant to the intent of the incoming text message 310 and/or the user-generated text message content 318. For instance, the context request seeks additional contextual content responsive to: "Where are you?, Where are you going?, Who is going?, and Where to you expect me to be?." In one example, an AI agent on device 310 (e.g., a first AI agent) may receive the context request 312, and may determine the intent in accordance with an NLP intent determination module and/or a rule-based intent determination module. In one example, the first AI agent may determine which information is available that is responsive to the context request 312. In addition, the first AI agent may determine which responsive information is permitted to be shared with the second AI agent and/or the second participant. For instance, the first user may have various permissions for different contacts or groups of contacts associated with different categories of user data. At stage 3, the first AI agent may send an additional context response 316 with additional contextual content, e.g., "Hotel lobby [with latitude and longitude provided], Dinner reservation at restaurant for 4 people, Need an ETA to restaurant."

In one example, the second AI agent may then receive the additional contextual content from the additional context response 316. In one example, the second AI agent may then modify the user-generated text message content to generate an updated text message content 320, which may then be sent to the first device 301 in stage 4. For instance, the AI agent may be an ML-based generative model that may generate an output text message content based upon inputs of: the user-generated text message content 318 and additional contextual content (which may include the conversation history/transcript, as well as the additional contextual content from the additional context response 316). In one example, the additional contextual content that may comprise the input(s) may further include contextual content of the second user, e.g., which may be accessed from other applications on device 302 itself and/or from one or more network-based systems (e.g., user data of the second user from a social media service provider, etc.). It should be noted that FIG. 3 is just one example of a message exchange including AI agents for two participants in a text-based conversation, and that other, further, and different examples may include text-based conversations with a more substantial message history/message chain, different intents and contexts, and so forth.

FIG. 4 illustrates a flowchart of an example method 400 for generating a revised text message content in accordance with additional contextual content identified from a context associated with a sender and a recipient, in accordance with the present disclosure. In one example, steps, functions, and/or operations of the method 400 may be performed by a device or apparatus as illustrated in FIG. 1, e.g., one or more of servers 135, or one of endpoint devices 112-113 or 121-123, or by a network-based processing system 205 as illustrated in FIG. 2 or one of the data owner devices 231-233. Alternatively, or in addition, the steps, functions and/or operations of the method 400 may be performed by a processing system collectively comprising a plurality of devices as illustrated in FIG. 1 such as one or more of servers 135, DB(s) 136, endpoint devices 111-113 and/or 121-123, or as illustrated in FIG. 2, such as network-based processing system 210, AI agent platform 205, data owner devices 231-233, and so forth. In one example, the steps, functions, or operations of method 400 may be performed by a computing device or system 500, and/or a processing system 502 as described in connection with FIG. 5 below. For instance, the computing device 500 may represent at least a portion of a platform, a server, a system, and endpoint device and so forth, in accordance with the present disclosure. For illustrative purposes, the method 400 is described in greater detail below in connection with an example performed by a processing system. The method 400 begins in step 405 and may proceed to optional step 410 or to step 420.

At optional step 410, the processing system may obtain a context request from a recipient (e.g., to whom a message may be sent at step 450), where the context request requests additional contextual content. For instance, the context request may be obtained from an endpoint device of the recipient, e.g., an AI agent thereof, or from a network-based system acting on behalf of the recipient, such as a network-deployed AI agent of the recipient. In one example, the context request may be in accordance with a Rich Communication Services (RCS) protocol, or suite. For instance, as noted above, RCS enables the communication of text, video, voice, etc. in addition to the actual text message content being sent. Accordingly, in one example, the context request may be received as part of a same message that includes a message content from the recipient). However, in another example, the context request may be a stand-alone message, e.g., that does not include any content for user presentation/display, e.g., in an independent background process.

At step 420, the processing system obtains a text message content from a sender to a recipient (e.g., at least one recipient). For instance, the processing system may be a processing system of an endpoint device of the sender, or may be a network-based processing system, e.g., in a communication path between endpoint devices of the sender and recipient, respectively, such as deployed in a cellular network, at a network edge, in the cloud, e.g., in a data center, etc. In one example, the sender may be initiating a conversation with the recipient. In another example, the sender may be responding to a prior message from the recipient, e.g., that may be obtained at optional step 410 or otherwise.

At step 430, the processing system identifies additional contextual content based upon a context associated with the sender and/or the recipient (e.g., a group comprising the sender and/or at least one recipient). In one particular example, the context may be associated with both the sender and the recipient. For instance, the context may broadly comprise available user data/content that is associated with the relationship and communications between the sender and/or recipient, e.g., a designated contact category of the recipient within a contact list of the sender, a most recent communication between the parties, a volume of communication between the parties over one or more time windows, the contents of text messages or other text-based communications between the parties, user availability status, location, and/or scheduled events of the user(s), types of information typically shared (e.g., location, scheduled events, etc.), and so forth. In an example in which the processing system is of an endpoint device of the sender, all or a portion of the additional contextual content may be stored on and retrieved from the endpoint device. For instance, the additional contextual content may be obtained from an application of the endpoint device, such as a social media application, a global positioning system (GPS)/navigation application, a calendar application, and so forth. Alternatively, or in addition, the additional contextual content may be accessed by the processing system of the endpoint device from a network-based system, such as one or more servers of a social media application service provider, an OTT messaging application service provider, an online calendar service provider, and so forth. In another example in which the processing system is a network-based processing system, the additional contextual content may be similarly accessed from another network-based system (e.g., one or more servers of a social media application service provider, an OTT messaging application service provider, an online calendar service provider, and so forth, and/or of a network-based AI agent of the recipient) and/or may be accessed from an endpoint device of the sender, an endpoint device of the recipient, or both.

In one example, the additional contextual content may be selected based on the text message content. For instance, in one example, at least a portion of the additional contextual content may be selected via an AI agent that is implemented by the processing system. For instance, the AI agent may comprise an ML-based generative model, such as a GAN model, a BERT model, a GPT model, or other LLM, and so forth. In one example, the AI agent may include an intent-determination component, which may determine an intent based upon the text message content, and in one example, further based upon a conversation history, e.g., a transcript of text messages between the sender and recipient. For instance, the processing system may perform a semantic search by vectorizing the text message content and/or a conversation history (e.g., within a defined look-back window, or other time periods or number of messages) and then comparing the vectors/vector embeddings to vectors associated with various endpoint device-based and/or network-based user data to find the closest matching vectors. In one example, the AI agent may be biased to replicate a persona of the sender associated with interactions with the recipient. For instance, by providing a full conversation history as additional input(s) to the ML-based model between the sender and recipient, the sender's tone, diction, choice of words/vocabulary, attention to grammar and spelling, etc. may be mimicked. Alternatively, or in addition, where the recipient is one of a group/class of contacts of the sender, additional communications of the sender with respect to other members of the group/class may be included as additional input(s) to the ML-based model.

Alternatively, or in addition, in one example, the additional contextual content may be identified in response to a context request that may be obtained at optional step 420. For instance, an AI agent of the recipient may request contextual content of one or more types. As such, the processing system may specifically retrieve the contextual content of the type(s) requested, e.g., user data, which may be available on an endpoint device associated with the sender and/or from one or more network-based systems as described above. In one example, the processing system may retrieve user data/additional contextual content that may be responsive to the context request and/or that may be identified based upon the text message content, e.g., based on the sender intent. In one example, the processing system may determine whether the user data/additional contextual content is permitted to be shared or otherwise used in connection with generating a revised text message content. For instance, the sender may designate different types of user data as being permitted to be shared with specific contacts or groups/categories of contacts. Thus, if the recipient is not designated, or is not of a designated group having permission with respect to a particular type of user data, then even if the user data is of a type that is specifically requested or that is associated with an intent of the text message content, then the user data may be excluded from the additional contextual content that may ultimately be selected at step 430.

At step 440, the processing system generates a revised text message content based upon the text message content in accordance with the additional contextual content. For instance, in one example, the generating of the revised text message may be via the AI agent that is implemented by the processing system, e.g., an ML-based generative model, such as a GAN model, a BERT model, a GPT model, or other LLM, and so forth. In one example, step 440 may include a retrieval augmented generation (RAG) process associated with the generative model. For instance, the additional contextual content that is selected at step 430 may be added to the prompt, e.g., included as supplemental input data to an ML-based generative model. In one example, step 440 may include processing an input/prompt having a well-defined format, e.g., a template, such as: "Generate a response to the other party. The response should be in the voice of the user and include information the other party may find useful in the context. The response should also convey the following intent: (insert user-drafted text message content)." In one example, the input may further include the additional contextual content, e.g., the additional contextual content may be appended to the prompt.

It should be noted that in one example, the additional contextual content may include a recent conversation history. Alternatively, the recent conversation history may be included as a default input as part of a prompt template. For instance, the example prompt template discussed above may be expanded to further include " . . . . The recent conversation history is: (insert recent conversation history)." As noted above, the recent conversation history may be over a defined period of time, e.g., the last 2 hours, the last 24 hours, etc. Alternatively, or in addition, the recent conversation history may include messages that may be grouped based on time (e.g., messages close in time will likely be related to a same topic, whereas longer gaps may indicate a new topic of conversation), or grouped based on time and subject matter (e.g., messages close in time and with semantically related content may be grouped together), etc. In any case, the processing system may process the input/prompt via the AI agent (e.g., via an ML-based generative model) and may generate an output therefrom. For instance, the output may comprise a new/revised text message content that may be based upon the original text message content of step 420, but which may include more useful information based on the additional contextual content while retaining the voice/style of the sender.

At step 450, the processing system transmits a message comprising the revised text message content to the recipient, e.g., to an endpoint device thereof and/or to a network-based AI agent, or other intermediary systems acting on behalf of the recipient. For instance, the message may comprise a text message, e.g., an SMS or MMS message, a message in accordance with Message Session Relay Protocol (MSRP), e.g., RCS or the like, a message via an OTT messaging application, etc.

Following step 450, the method 400 proceeds to step 495 where the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as steps 410-450 or steps 420-450 for additional messages from the sender to the recipient, or for one or more messages to a different recipient, which may or may not use a different "persona" of the sender in connection with the revised text message content that may be generated at step 440. In one example, the message may be transmitted in accordance with another communication modality, such as an email. In one example, the method 400 may include training the AI agent and/or one or more generative ML-based models thereof, which may include selecting training data relevant to one or more particular personas (e.g., associated with one or more types of contacts of the sender, etc.), and so forth. In one example, the method 400 may be expanded or modified to include steps, functions, and/or operations, or other features described above in connection with the example(s) of FIGS. 1-3 or FIG. 5, or as described elsewhere herein. Thus, these and other modifications are all contemplated within the scope of the present disclosure.

In addition, although not expressly specified above, one or more steps of the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 5 depicts a high-level block diagram of a computing system 500 (e.g., a computing device or processing system) specifically programmed to perform the functions described herein. For example, any one or more components, devices, and/or systems illustrated in FIG. 1 or FIG. 2, or described in connection with FIG. 3 or FIG. 4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for generating a revised text message content in accordance with additional contextual content identified from a context associated with a sender and/or a recipient, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for generating a revised text message content in accordance with additional contextual content identified from a context associated with a sender and/or a recipient (e.g., a software program comprising computer-executable instructions) can be loaded into memory 504 and executed by hardware processor element 502 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for generating a revised text message content in accordance with additional contextual content identified from a context associated with a sender and/or a recipient (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical device(s) that provide(s) the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
    obtaining, by a processing system including at least one processor, a context request from an endpoint device of a recipient, wherein the context request requests an additional contextual content, and wherein the context request comprises a rich communication services message;
    obtaining, by the processing system, a text message content from a sender to the recipient;
    identifying, by the processing system, the additional contextual content based upon a context associated with at least one of: the sender or the recipient, wherein the identifying of the additional contextual content is in response to the context request;
    generating, by the processing system, a revised text message content based upon the text message content in accordance with the additional contextual content; and
    transmitting, by the processing system, a message to the recipient comprising the revised text message content.

2. The method of claim 1, wherein the processing system comprises a processing system of an endpoint device of the sender.

3. The method of claim 2, wherein the additional contextual content is stored at the endpoint device of the sender.

4. The method of claim 2, wherein the additional contextual content is obtained from an application of the endpoint device of the sender.

5. The method of claim 2, wherein the additional contextual content is accessed by the endpoint device of the sender from a network-based system.

6. The method of claim 1, wherein the processing system comprises a network-based processing system.

7. The method of claim 6, wherein the additional contextual content is accessed by the processing system from one or more other network-based systems.

8. The method of claim 1, wherein the additional contextual content is further based on the text message content.

9. The method of claim 8, wherein the additional contextual context content is selected via an artificial intelligence agent implemented by the processing system.

10. The method of claim 9, wherein the artificial intelligence agent comprises a machine learning-based language model.

11. The method of claim 1, wherein the revised text message content is generated via an artificial intelligence agent implemented by the processing system.

12. The method of claim 11, wherein the artificial intelligence agent comprises a machine learning-based language model.

13. The method of claim 11, wherein the additional contextual content is selected via the artificial intelligence agent implemented by the processing system.

14. The method of claim 13, wherein the identifying of the additional contextual content and the generating of the revised text message content comprises a retrieval augmented generation process.

15. The method of claim 1, wherein the revised text message content is generated as an output of a machine learning-based language model in response to a prompt comprising the text message content and the additional contextual content.

16. The method of claim 1, wherein the message comprises a rich communication services message.

17. A non-transitory computer-readable medium storing instructions which, when executed by a processing system including at least one processor, cause the processing system to perform operations, the operations comprising:
    obtaining a context request from an endpoint device of a recipient, wherein the context request requests an additional contextual content, and wherein the context request comprises a rich communication services message;
    obtaining a text message content from a sender to the recipient;
    identifying the additional contextual content based upon a context associated with at least one of: the sender or the recipient, wherein the identifying of the additional contextual content is in response to the context request;
    generating a revised text message content based upon the text message content in accordance with the additional contextual content; and
    transmitting a message to the recipient comprising the revised text message content.

18. An apparatus comprising:
    a processing system including at least one processor; and
    a non-transitory computer-readable medium storing instructions which, when executed by the processing system, cause the processing system to perform operations, the operations comprising:
        obtaining a context request from an endpoint device of a recipient, wherein the context request requests an additional contextual content, and wherein the context request comprises a rich communication services message;
        obtaining a text message content from a sender to the recipient;
        identifying the additional contextual content based upon a context associated with at least one of: the sender or the recipient, wherein the identifying of the additional contextual content is in response to the context request;

generating a revised text message content based upon the text message content in accordance with the additional contextual content; and transmitting a message to the recipient comprising the revised text message content.

19. The apparatus of claim 18, wherein the processing system comprises a processing system of an endpoint device of the sender.

20. The apparatus of claim 19, wherein the additional contextual content is stored at the endpoint device of the sender.

* * * * *